United States Patent

Cushman

[15] 3,652,929
[45] Mar. 28, 1972

[54] METHOD FOR HEALING SHORT CIRCUITS IN CAPACITORS

[72] Inventor: Robert Holbrook Cushman, Princeton, N.J.

[73] Assignee: Western Electric Company, Incorporated, New York, N.Y.

[22] Filed: Feb. 9, 1970

[21] Appl. No.: 9,582

[52] U.S. Cl. ................................................324/51, 324/60
[51] Int. Cl. ....................................G01r 31/02, G01r 27/26
[58] Field of Search ................................324/51, 54, 60

[56] References Cited

UNITED STATES PATENTS 2,769,889  11/1956  Dubilier ..............................324/51 X
2,911,590  11/1959  Shillington ..............................324/51

Primary Examiner—Alfred E. Smith
Attorney—W. M. Kain, R. P. Miller and R. C. Winter

[57] ABSTRACT

Resistance of self-healing capacitors is measured to detect short circuits of lowest resistance. Electrical charge of relatively high current for relatively short time is applied to burn out lowest resistance short circuits. Resistance is again measured to detect short circuits of higher resistance. Electrical charge of relatively lower current for relatively longer time is applied to burn out higher resistance short circuits. Resistance is again measured to detect short circuits of still higher resistance. Electrical charge of relatively still lower current for relatively still longer time is applied to burn out still higher resistance short circuits.

4 Claims, 2 Drawing Figures

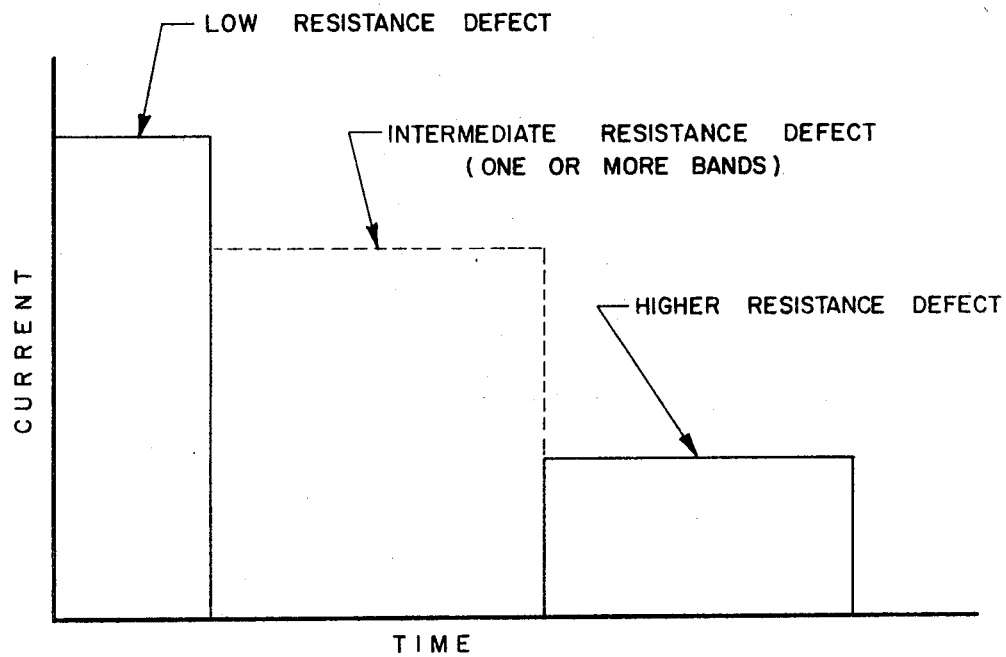

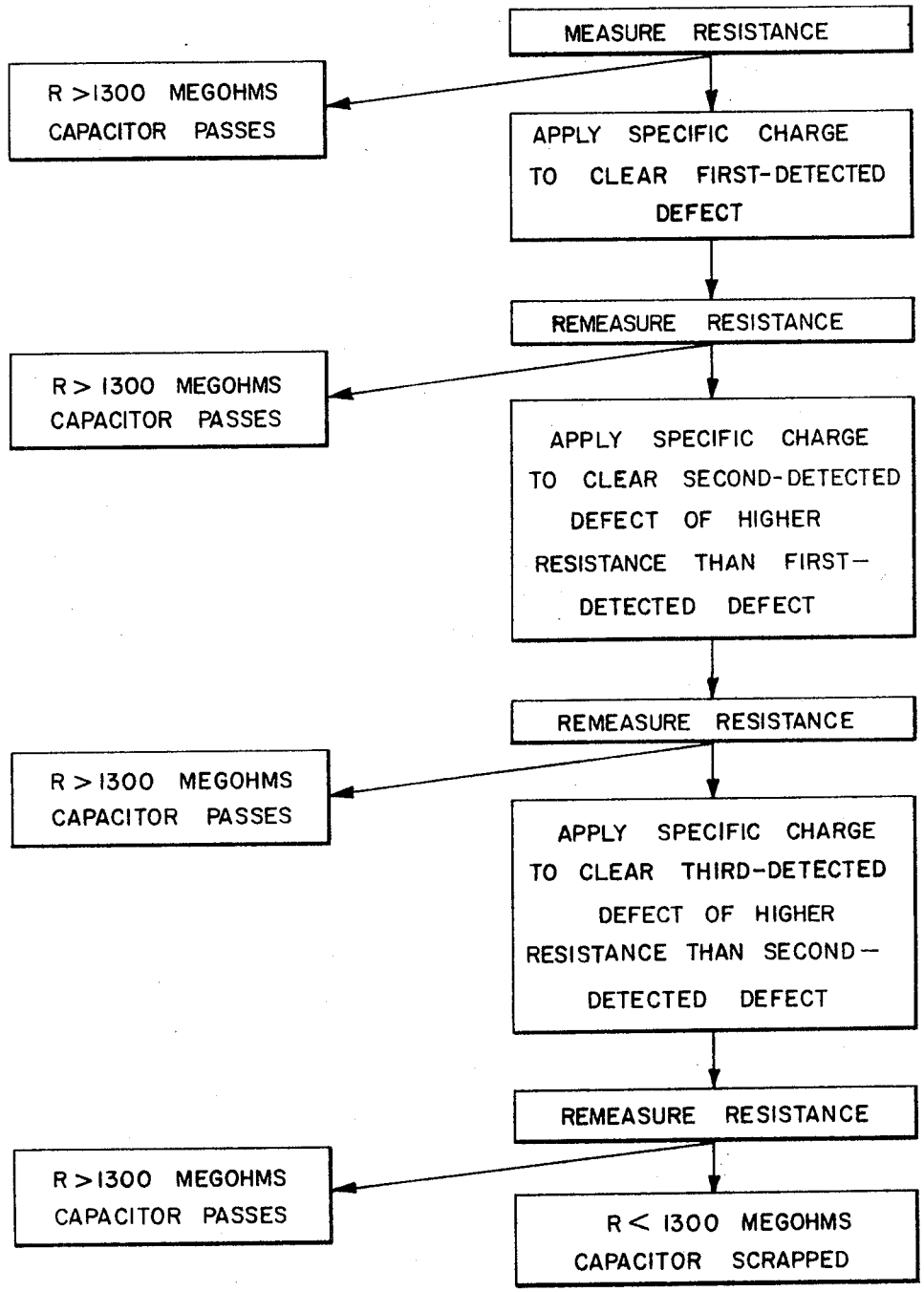

METHOD FOR HEALING SHORT CIRCUITS IN CAPACITORS

BACKGROUND OF THE INVENTION

1. Field of the Invention

This invention relates, broadly, to a method for healing defects in capacitors. More specifically, this invention relates to a method for clearing self-healing capacitors by burning out short circuits by means of controlled electrical charges.

2. Description of the Invention

Capacitors currently made by depositing an ultra thin metallic film on a thin paper or plastic (e.g., Mylar) base or dielectric may have, by way of example, a metallic film thickness ranging between approximately $3 \times 10^{-6}$ inches to approximately $6 \times 10^{-6}$ inches, and a base or dielectric thickness ranging between approximately $1 \times 10^{-4}$ inches to approximately $1.5 \times 10^{-3}$ inches. In the course of manufacture, pinholes may appear in the thin dielectric between the opposed metallic films and, under sufficient pressure, the metallic films may come into mutual contact through the said pinholes to cause a short circuit through the capacitor. Also, impurities of a conductive nature may become embedded in the dielectric in contact with the opposed metallic films to cause a short circuit through the capacitor. These short circuits result in a lowering of the electrical resistance across the capacitor, the said electrical resistance being a measure of the rate of leakage of an electrical charge across the dielectric. If the short circuit is severe (i.e., the electrical resistance across the capacitor is too low), the capacitor is unusable and must be cleared of such short circuit or scrapped. In the species of capacitor first described above, it is possible to clear such capacitors by burning out the cause of the short circuit, due to the thinness of the metallic film and dielectric, and these capacitors are commonly known as self-healing capacitors to distinguish them from non-self-healing capacitors in which short circuits cannot be burned out.

Specifically, the burning out process vaporizes those portions of the opposed metallic films which are in mutual contact through a pinhole in the dielectric, and also vaporizes embedded conductive impurities in the dielectric and adjacent portions of the opposed metallic films.

Conventionally, the self-healing capacitor is subjected to the discharge of a charged capacitor bank with a current limiting resistance in series therewith, the amount of the charge and the value of the resistor being constant for the particular type of capacitor being healed or cleared of short circuits, without any regard for the magnitude and number of short circuits in the specific capacitor being healed. Thereafter, a dielectric strength test is performed at high voltage, and if the specific capacitor has not been sufficiently healed, it is discarded.

If too high a current is applied to heal a particular short circuit, or if current is applied for too long a period of time, then the dielectric in the vicinity of the short circuit will be heated to too high a temperature and degraded (i.e., carbonized, the product thereof being conductive), resulting in further short circuits in an avalanche effect, thus destroying the capacitor.

If too low a current is applied to heal a particular short circuit, or if current is applied for too short a period of time, then the short circuit will not be burned out.

With the aforesaid conventional approach to clearing, employing an electrical charge without regard for the value of the short circuit to be cleared, many of the defective capacitors will either be destroyed due to excessive current and/or duration thereof or will not be healed.

Prior art of interest can be found in U.S. Pat. No. 2,769,889 (1956) to Dubilier and U.S. Pat. No. 2,911,590 (1959) to Shillington.

SUMMARY OF THE INVENTION

One of the objects of this invention is to provide an improved method for healing defects in capacitors.

Another of the objects of this invention is to provide an improved method for burning out short circuits in self-healing capacitors.

Other and further objects of this invention will become apparent during the course of the following description and by reference to the accompanying drawings and the appended claims.

Briefly, I have discovered that the foregoing objects may be attained by measuring the electrical resistance across a self-healing capacitor to detect short circuits of lowest resistance, applying to the capacitor an electrical charge controlled to deliver only sufficient energy to burn out said lowest resistance short circuits, then remeasuring the electrical resistance across the capacitor to detect short circuits of higher resistance, applying to the capacitor another electrical charge controlled to deliver only sufficient energy to burn out said higher resistance short circuits, then remeasuring the electrical resistance across the capacitors to detect short circuits of still higher resistance, and applying to the capacitor still another electrical charge controlled to deliver only sufficient energy to burn out said still higher resistance short circuits.

BRIEF DESCRIPTION OF THE DRAWINGS

Referring now to the drawings:

FIG. 1 represents a chart correlating current, duration of current and nature of short circuits, in a qualitative manner, within the context of the present invention.

FIG. 2 represents a flow diagram of the various steps employed in the practice of the present invention.

DESCRIPTION OF THE PRESENT INVENTION

The present invention is based upon the application of sufficient electrical energy, and not substantially in excess thereof, to burn out a short circuit of measured resistance. Short circuits of low resistance will require a relatively high current of relatively short duration. Short circuits of higher resistance will require a relatively low current of relatively long duration. Short circuits of intermediate resistance will require intermediate currents of intermediate duration. The current, in all cases, provides an $I^2R$ or heating effect which vaporizes the cause of the short circuit, and the total energy delivered to cause such vaporization is a function of the product of $I^2R$ and the time of application of the heating current. Within certain limits, there can be some relative variation in current and time to achieve the desired heating effect to vaporize the cause of the short circuit.

As a practical matter, with a view toward the economics of the present invention, short circuits can be classed as low resistance, higher resistance, and an intermediate resistance band and the current and times of application are shown qualitatively in FIG. 1. If desired, several intermediate resistance bands of classification can be employed, with descending values of current and increasing times of application thereof, in proceeding from left to right of FIG. 1.

In measuring the resistance of a capacitor having short circuits of varying degree therethrough, the short circuit of lowest resistance will to some extent mask short circuits of higher resistance.

With the foregoing discussion in mind, the practice of the present invention will now be described.

The resistance of the self-healing capacitor under test is first measured. If the resistance is sufficiently high, e.g., above approximately 1,300 megohms, the capacitor is usable without any clearing or burning out operation. If the resistance is below this level, and the lowest resistance short circuits will show up first, an electrical charge according to FIG. 1, for the time also shown in FIG. 1, is applied to the capacitor to burn out the first-electrical short circuit. A variable capacitor bank with variable resistors in series therewith may be employed to deliver the charge.

Thereafter, the resistance of the capacitor under test is again measured. If the resistance is sufficiently high, e.g., above approximately 1,300 megohms, the capacitor is usable without any further clearing operation. If the resistance is below the value acceptable for usable capacitors (e.g., below approximately 1,300 megohms), this means that the capacitor has a short circuit of higher resistance than the first detected short circuit and serious enough to render the capacitor unusable. Thereupon, a second electrical charge according to FIG. 1, for the time also shown in FIG. 1, is applied to the capacitor to burn out the second detected short circuit.

Thereafter, the resistance of the capacitor under test is again measured. If the resistance is sufficiently high, e.g., above approximately 1,300 megohms, the capacitor is usable without any further clearing operation. If the resistance is below the value acceptable for usable capacitors (e.g., below approximately 1,300 megohms), this means that the capacitor has a short circuit of higher resistance than the second detected short circuit and serious enough to render the capacitor unusable. Thereupon, a third electrical charge according to FIG. 1, for the time also shown in FIG. 1, is applied to the capacitor to burn out the third-detected short circuit.

Thereafter, the resistance of the capacitor under test is again measured. If the resistance is sufficiently high, e.g., above approximately 1,300 megohms, the capacitor has been cleared or healed of all short circuits serious enough to render the capacitor unusable. If the resistance is below the value acceptable for usable capacitors (e.g., below approximately 1,300 megohms), the capacitor is discarded.

As hereinbefore discussed, short circuits are classified in three resistance bands (low, intermediate, and higher) for economic reasons. If economically justifiable, more than three resistance bands of classification may be employed, each to be serviced by its own electrical charge and duration thereof. Specifically, there may be several intermediate bands of short circuit resistance. On the other hand, it may be desirable for economic reasons, to consider the short circuit resistance value as one band (meaning that only one electrical charge tailored to the measured resistance is applied for the appropriate time, and that the capacitor passes or fails on the basis of one subsequent resistance measurement) or as two bands (with two clearing charges employed as required).

It will be understood that, in the course of applying sequential clearing charges in accordance with sequential resistance measurements as hereinbefore described, after the application of a particular clearing charge relating to a particular band of resistance classification, a subsequent resistance measurement may indicate a short circuit of lower resistance than the resistance previously measured in the course of such sequential resistance measurements. This indicates that a short circuit just beyond the previously measured resistance band has received too much electrical energy (the time of application of the clearing charge, while proper for the resistance band taken as a whole, was excessive for the particular short circuit), degradation of the dielectric in the capacitor has resulted, and the capacitor will have to be scrapped. Statistically, a certain number of rejects from this type of occurrence should be expected where the resistance is classified as a finite number of bands. Obviously, the fewer the resistance bands, the greater the likelihood of this type of defect occurring, and the greater the number of resistance bands, the less the likelihood of this type of defect occurring.

Specific examples illustrating the method of the present invention are:

1. A 1.5 microfarad capacitor, with a one-fourth-mil thick Mylar dielectric interposed between zinc metallizing of $3 \times 10^{-6}$ inches in thickness, showed a 1,000-megohm resistance, below the 1,300-megohm minimum resistance criterion for usable capacitors (which 1,000-megohm resistance can be classified as a high resistance short circuit). A charge of 700–800 volts delivering a current of 0.7–0.8 microamperes, was applied for 5 seconds. Thereafter, the capacitor showed a resistance of 50,000 megohms and passed.

2. The same type of capacitor showed a resistance of 100 megohms (classifiable as an intermediate resistance short circuit). A charge of 300 volts delivering a current of 3 microamperes was applied for 2 seconds. Thereafter, the capacitor showed a resistance of 40,000 megohms and passed.

3. The same type of capacitor showed a resistance of 0.1 megohms (classifiable as a low resistance short circuit). A charge of 350 volts (delivered across a 32 microfarad capacitor, producing a current of 3,500 microamperes peak value with exponential decay and hence of short duration) was applied. Thereafter, the capacitor showed a resistance of 40,000 megohms and passed.

What is claimed is:

1. Method of clearing a self-healing capacitor, said method comprising:
   a. making a resistance measurement across said self-healing capacitor to detect a short circuit across said capacitor and the electrical resistance of said short circuit;
   b. applying an electrical charge across the capacitor, the current and duration of said electrical charge being proportionate to the electrical resistance of said short circuit, whereby to deliver sufficient electrical energy, and not substantially in excess thereof, to burn out said short circuit;
   c. subsequent to step (b), making a second resistance measurement across said self-healing capacitor to detect a second short circuit across said capacitor and the electrical resistance of said second short circuit, said second short circuit having a higher electrical resistance than said first-mentioned short circuit;
   d. applying a second electrical charge across the capacitor, the current and duration of said second electrical charge being proportionate to the electrical resistance of said second short circuit, whereby to deliver sufficient electrical energy, and not substantially in excess thereof, to burn out said second short circuit.

2. Method as in claim 1, wherein:
   e. said second electrical charge has a lower current than said first-mentioned electrical charge.

3. Method as in claim 1, wherein:
   e. said second electrical charge has a longer duration than said first-mentioned electrical charge.

4. Method as in claim 1, wherein:
   e. said second electrical charge has a lower current than said first-mentioned electrical charge,
   f. said second electrical charge has a longer duration than said first-mentioned electrical charge.

* * * * *

UNITED STATES PATENT OFFICE
CERTIFICATE OF CORRECTION

Patent No. 3,652,929  Dated March 28, 1972

Inventor(s) Robert Holbrook Cushman

It is certified that error appears in the above-identified patent and that said Letters Patent are hereby corrected as shown below:

Column 1, line 15, "3 x $10^-{}_6$" should read --3 x $10^{-6}$-- line 16, "6 x $10^-{}_6$" should read --6 x $10^{-6}$--; line 17, "1 x $10^-{}_4$" should read --1 x $10^{-4}$--; line 18, "1.5 x $10^-{}_3$" shoul read --1.5 x $10^{-3}$--.

Signed and sealed this 19th day of September 1972.

(SEAL)
Attest:

EDWARD M. FLETCHER, JR.
Attesting Officer

ROBERT GOTTSCHALK
Commissioner of Patents